Figure 1:
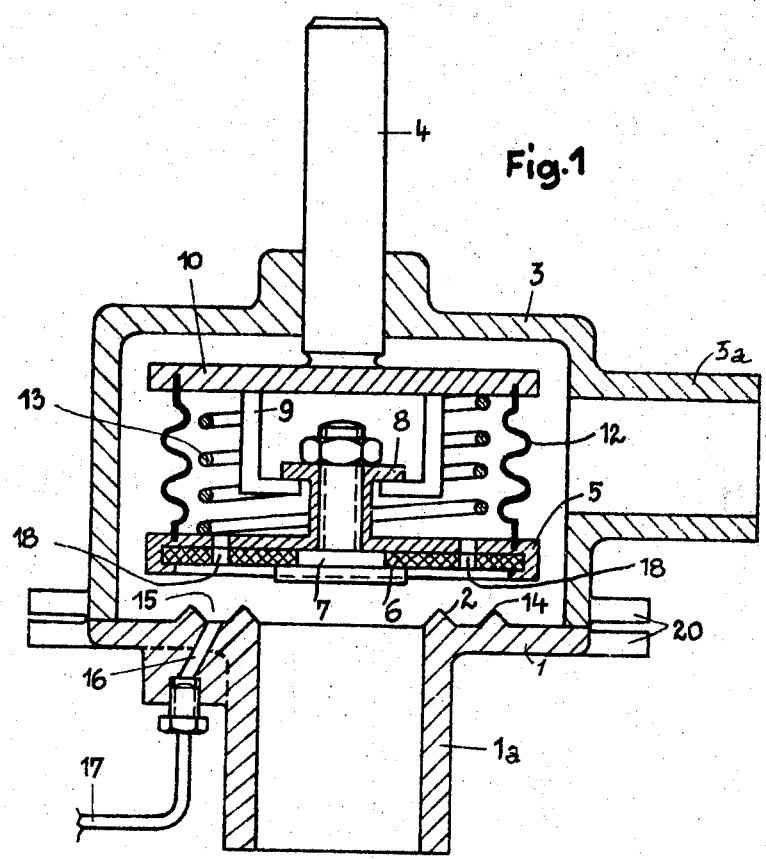

United States Patent [19]
Braidt et al.

[11] 3,835,878
[45] Sept. 17, 1974

[54] SHUTOFF VALVE WITH LEAK INDICATING MEANS

[76] Inventors: Helfried Braidt, Edward Potzl-Gasse, Vienna 1190; Johann Figl, Fleischmanngasse 4, Vienna 1040, both of Austria

[22] Filed: Feb. 2, 1973

[21] Appl. No.: 329,173

[30] Foreign Application Priority Data
Feb. 4, 1972 Austria ................................ 934/72

[52] U.S. Cl................ 137/246.13, 73/46, 137/557, 251/175
[51] Int. Cl.......................... F16k 25/02, G01m 3/28
[58] Field of Search ....... 73/46, 49.8; 137/312, 557, 137/246.13; 251/57, 83

[56] References Cited
UNITED STATES PATENTS
| | | | |
|---|---|---|---|
| 2,629,606 | 2/1953 | Fraser................................ | 137/312 |
| 3,070,965 | 1/1963 | Andersen et al................. | 137/312 X |
| 3,344,807 | 10/1967 | Lehrer et al......................... | 137/557 |

*Primary Examiner*—William R. Cline
*Assistant Examiner*—Richard Gerard
*Attorney, Agent, or Firm*—Kurt Kelman

[57] ABSTRACT

Leaks between the valve head and the valve seat of a shutoff valve are detected by providing an air containing housing attached to the valve head and moving therewith into a shut position in respect of a valve seat. The air pressure in the housing increases during the valve shutting movement and a chamber closed by engagement of the valve head and the valve seat when the valve is shut is in communication with the interior of the housing and the exterior of the valve so that pressure changes due to a leak between the valve seat and valve head may be measured.

4 Claims, 2 Drawing Figures

PATENTED SEP 17 1974 3,835,878

SHUTOFF VALVE WITH LEAK INDICATING MEANS

The present invention relates to improvements in a shutoff valve which comprises means for detecting valve leaks.

Austrian Pat. No. 250,106 proposes a shutoff valve with two axially adjacent valve bodies forming a pressure measuring chamber in conjunction with a valve seat. To assure proper operation, the two valve bodies must be resiliently mounted in respect of each other, which causes an expensive construction as well as sealing problems.

It is the primary object of this invention to simplify and improve shutoff valves of this general type.

The shutoff valve comprises a valve housing having a fluid inlet and a fluid outlet. The housing defines a valve chamber between the inlet and the outlet and a valve seat is provided in the valve chamber. A valve head is mounted in the valve chamber for movement between an open and shut position, the valve head being spaced from the valve seat in the open position and being in engagement therewith in the shut position. Such a valve is improved in accordance with the invention by attaching a fluid medium containing housing to the valve head for movement therewith. Means is provided for changing the fluid medium pressure in the fluid medium containing housing in response to the shutting movement of the valve head. Furthermore, means including the valve seat and effective upon engagement of the valve head with the valve seat is provided for receiving the fluid medium pressure from the fluid medium containing housing whereby any leak between the valve seat and the valve head reduces the air pressure. Conduit means in the valve housing transmits the pressure from the latter means to the outside of the valve housing where this pressure may be measured. When the measured pressure deviates from a limit value, which indicates a tightly shut valve, an alarm signal may be actuated or an automatic control for the fluid flow through the valve may be operated.

Figure 2:
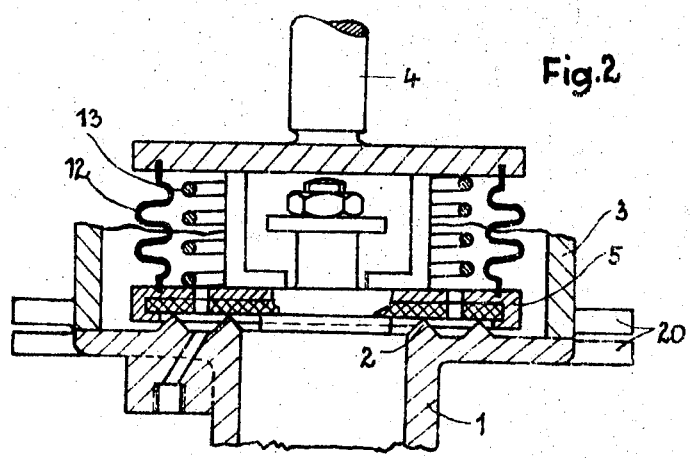

The above and other objects, advantages and features of the present invention will become more apparent from the following detailed description of a now preferred embodiment thereof, taken in conjunction with the accompanying drawing wherein FIG. 1 is a vertical cross section showing a shutoff valve according to this invention in open position, and FIG. 2 is a similar, partial view showing the valve in the shut position.

Referring now to the drawing, the valve housing is shown to comprise a lower valve housing part 1 having a fluid outlet (or inlet) 1a and an upper valve housing part 3 having a fluid inlet (or outlet) 3a. The upper valve housing part has an axial bore wherein valve stem or spindle 4 is reciprocably mounted for moving valve head or disk 5 between an open position (shown in FIG. 1) and a shut position (shown in FIG. 2), the valve head being spaced from annular valve seat 2 in the valve chamber in the open position and being in engagement with the valve seat in the shut position. The valve stem may be operated manually or may be moved by an actuating mechanism (not shown).

The valve head carries a gasket or sealing member 6 affixed thereto by means of threaded bolt 7 passing through a neck portion including flange 8 in axial alignment with valve stem 4. The stem is attached to end wall 10 which has attached thereto a bracket 9 including a shoulder. The flange 8 freely rests on the shoulder for suspending the valve head from the end wall, valve head 5 and end wall 6, with their respective parts 8 and 9, being movable relative to each other in the axial direction. A bellows side wall 12 of metal or synthetic resin interconnects the valve head and the end wall to form a fluid medium containing housing attached to the valve head for movement therewith. When the valve stem is operated to effectuate the shutting movement, i.e., when it is moved downwardly, the end wall 10 will be moved closer to valve head 5 to reduce the volume of the housing and thus to increase the pressure therein in response to the shutting movement of the valve head, helical compression spring 13 being mounted in this housing between the valve head and the end wall to hold the bellows side wall in its tensioned condition when the valve is open.

A second seat 14 concentrically surrounds valve seat 2 so that a chamber consisting of an annular groove 15 is defined between the seats. A conduit or bore 16 in the valve housing establishes communication between the chamber 15 and the outside of the valve housing, and bores 18 passing through valve head 5 and gasket 6 establish communication between the interior of the housing 5, 10, 12 and chamber 15.

While the valve housing is shown to be comprised of parts 1 and 3 having matching flanges 20 which may be screwed together, it will be readily understood that the valve housing may take any desired and suitable form.

The shutoff valve hereinabove described operates in the following manner:

Upon movement of the valve stem 4 in the downward direction, the gasket 6 of the valve head will finally be in engagement with seats 2 and 14 to shut off fluid flow through the valve chamber between the valve inlet and outlet. Upon further movement of the valve stem, the end wall 10 will be depressed against the bias of spring 13, thus compressing the fluid medium within the housing formed by end wall 10, valve head 5 and bellows side wall 12. At this point and assuming there is no leak between the gasket 6 and seats 2, 14, the annular groove 15 constitutes a means for receiving the fluid medium pressure from the fluid medium containing housing through bores 18 which register with groove 15. This pressure is transmitted from groove 15 through conduits 16 and 17 to a manometer (not shown) which registers the pressure and/or to a control (not shown) for regulating flow of a fluid through the valve. If there is a leak between the seats and the gasket, the pressure in groove 15 will decrease and this decrease will be registered. When the resistered pressure falls below a set limit value, an alarm signal may be produced and/or the fluid flow control may be operated.

It will be obvious to those skilled in the art that an equivalent structure and function will be obtained by mounting seats 2 and 14 on the valve head and gasket 6 on the interior wall of the valve housing part 1 facing the valve head. Similarly, seat 14 could be replaced by a peripherally enlarged part of valve head 5 cooperating like piston and cylinder with a sealing surface on the valve housing.

In the shutoff valve of the present invention, the valve seat provides means effective upon engagement of the valve head with the valve seat for receiving the fluid pressure from the fluid medium containing housing whereby any leak between the valve seat and the valve head reduces the pressure.

What is claimed is:

1. A shutoff valve comprising
   1. a valve housing having a fluid inlet and fluid outlet,
      a. the housing defining a valve chamber between the inlet and outlet;
   2. a valve seat in the valve chamber;
   3. a valve head mounted in the valve chamber for movement between an open and shut position, the valve head being spaced from the valve seat in the open position and being in engagement with the valve seat in the shut position;
   4. a fluid medium containing housing attached to the valve head for movement therewith;
   5. means for changing the fluid medium pressure in the fluid medium containing housing in response to the closing movement of the valve head and maintaining the pressure at a predetermined level;
   6. means including the valve seat and valve head contacting surfaces, and effective upon engagement of the valve head with the valve seat for receiving the fluid medium pressure from the fluid medium containing housing whereby any leak between the valve seat and the valve head reduces the pressure of the medium from the predetermined level; and conduit means in the valve housing for transmitting the pressure from the latter means to the outside of valve housing.

2. The shutoff valve of claim 1, wherein the fluid medium containing housing is comprised of the valve head, an end wall aligned with, and spaced from the valve head, and a bellows side wall interconnecting the valve head and the end wall, a valve stem being reciprocably mounted in the valve housing and being attached to the end wall for effectuating the movement of the valve head whereby the bellows side wall provides for an expansion and contraction of the fluid medium containing housing to constitute the means for changing the pressure, and a compression spring mounted in the fluid medium containing housing between the valve head and the end wall.

3. The shutoff valve of claim 2, further comprising a bracket including a shoulder attached to the end wall, a neck portion including a flange attached to the valve head, the flange freely resting on the shoulder for suspending the valve head from the end wall.

4. The shutoff valve of claim 1, wherein the means for receiving the pressure comprises a second seat concentric about the valve seat, the seats defining a chamber therebetween, the chamber being in communication with the interior of the fluid medium containing housing and with the conduit means.

* * * * *